(12) United States Patent
Okuda

(10) Patent No.: US 12,731,734 B2
(45) Date of Patent: Sep. 8, 2026

(54) MULTILAYER CERAMIC CAPACITOR

(71) Applicant: Murata Manufacturing Co., Ltd., Nagaokakyo (JP)

(72) Inventor: Hikaru Okuda, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 240 days.

(21) Appl. No.: 18/760,077

(22) Filed: Jul. 1, 2024

(65) Prior Publication Data

US 2024/0355551 A1 Oct. 24, 2024

Related U.S. Application Data

(63) Continuation of application No. PCT/JP2023/032095, filed on Sep. 1, 2023.

(30) Foreign Application Priority Data

Nov. 10, 2022 (JP) ................................ 2022-180344

(51) Int. Cl.
*H01G 4/30* (2006.01)
*H01G 2/06* (2006.01)
(Continued)

(52) U.S. Cl.
CPC ............... *H01G 4/30* (2013.01); *H01G 2/065* (2013.01); *H01G 4/008* (2013.01); *H01G 4/012* (2013.01); *H01G 4/1227* (2013.01); *H01G 4/232* (2013.01)

(58) Field of Classification Search
CPC .......... H01G 2/065; H01G 4/30; H01G 4/008; H01G 4/1227; H01G 4/012; H01G 4/232
See application file for complete search history.

(56) References Cited

U.S. PATENT DOCUMENTS 6,124,769 A 9/2000 Igarashi et al.
12,020,868 B2 * 6/2024 Lee ........................ H01G 4/232
(Continued)

FOREIGN PATENT DOCUMENTS

JP H11111564 A 4/1999
JP 2004039937 A * 2/2004
(Continued)

OTHER PUBLICATIONS

International Search Report in PCT/JP2023/032095, mailed Nov. 14, 2023, 3 pages.

(Continued)

*Primary Examiner* — David M Sinclair
(74) *Attorney, Agent, or Firm* — Keating & Bennett, LLP

(57) ABSTRACT

In a multilayer ceramic capacitor, a relationship of a length in a width direction of a main surface horizontal portion to a length in the width direction of external electrodes is about 0.26 or more and about 0.56 or less, a relationship of a length in a lamination direction of a lateral surface horizontal portion to a length in a lamination direction of each of the external electrodes is about 0.26 or more and about 0.56 or less, a relationship of a length in a length direction of the main surface horizontal portion to a length in a length direction of each of the external electrodes is about 0.26 or more and about 0.56 or less, and a relationship of a length of the lateral surface horizontal portion to a length in a length direction of each of the external electrodes is about 0.26 or more ≤0.56.

16 Claims, 7 Drawing Sheets

(51) Int. Cl.

| | |
|---|---|
| ***H01G 4/008*** | (2006.01) |
| ***H01G 4/012*** | (2006.01) |
| ***H01G 4/12*** | (2006.01) |
| ***H01G 4/232*** | (2006.01) |

(56) References Cited

U.S. PATENT DOCUMENTS

| | | | | |
|---|---|---|---|---|
| 2009/0053853 | A1 | 2/2009 | Onodera et al. | |
| 2014/0085770 | A1 | 3/2014 | Park et al. | |
| 2014/0125448 | A1* | 5/2014 | Tsuchida | H01C 1/148 338/22 R |
| 2014/0285947 | A1* | 9/2014 | Suga | H01G 4/232 361/301.4 |
| 2020/0066455 | A1 | 2/2020 | Sato | |
| 2020/0075258 | A1* | 3/2020 | Park | H01G 4/232 |
| 2020/0105473 | A1* | 4/2020 | Martinez | H01G 4/224 |

FOREIGN PATENT DOCUMENTS

| | | | | | |
|---|---|---|---|---|---|
| JP | 2007281212 | A | | 10/2007 | |
| JP | 2008187037 | A | * | 8/2008 | H01G 4/30 |
| JP | 2008306244 | A | | 12/2008 | |
| JP | 2009049319 | A | | 3/2009 | |
| JP | 2014072522 | A | | 4/2014 | |
| JP | 2017011142 | A | | 1/2017 | |
| JP | 2020031152 | A | | 2/2020 | |
| JP | 2022117648 | A | | 8/2022 | |

OTHER PUBLICATIONS

Written Opinion in PCT/JP2023/032095, mailed Nov. 14, 2023, 4 pages.

Lee et al., “Investigation and Analysis of Cracks in Multi-layer Ceramic Capacitor”, Journal of the Korean Ceramic Society, vol. 46, No. 2, Mar. 20, 2009, pp. 211-218.

* cited by examiner

FIG. 4

MULTILAYER CERAMIC CAPACITOR

CROSS REFERENCE TO RELATED APPLICATIONS

This application claims the benefit of priority to Japanese Patent Application No. 2022-180344 filed on Nov. 10, 2022 and is a Continuation application of PCT Application No. PCT/JP2023/032095 filed on Sep. 1, 2023. The entire contents of each application are hereby incorporated herein by reference.

BACKGROUND OF THE INVENTION

1. Field of the Invention

The present invention relates to multilayer ceramic capacitors.

2. Description of the Related Art

A display module is known which includes a flexible housing, a plurality of non-flexible substrates built into the housing, and a flexible substrate coupling the plurality of substrates for (see, example, Japanese Unexamined Patent Application, Publication No. 2008-306244 and other documents). Since such a display module has flexibility as a whole, the display module can be used in a bent state. Further, a non-flexible substrate is connected to the display module, and electronic components are mounted on the substrate. Such electronic components include multilayer ceramic capacitors.

In recent years, the thickness of flexible modules such as display modules has been reduced. In such flexible modules having reduced thickness, when the flexible housing is bent, the housing may come into contact with multilayer ceramic components mounted on the substrate. When the multilayer ceramic capacitors contact the housing, the multilayer ceramic capacitors may be damaged.

SUMMARY OF THE INVENTION

Example embodiments of the present invention provide multilayer ceramic capacitors that are each able to improve stability when mounted on a substrate and reduce or prevent contact of a housing with multilayer ceramic capacitors.

An example embodiment of the present invention provides a multilayer ceramic capacitor that includes a multilayer body including a plurality of dielectric layers and a plurality of internal electrode layers that are laminated, a first main surface and a second main surface opposed to each other in a lamination direction, a first lateral surface and a second lateral surface opposed to each other in a width direction orthogonal or substantially orthogonal to the lamination direction, and a first end surface and a second end surface opposed to each other in a length direction orthogonal or substantially orthogonal to the lamination direction and the width direction, and external electrodes respectively provided on the first end surface and the second end surface and connected to the plurality of internal electrode layers. Each of the external electrodes extends to at least a portion of each of the first main surface, the second main surface, the first lateral surface, and the second lateral surface. A cross section in parallel or substantially in parallel to the width direction and the lamination direction is defined as a WT cross section. A cross section in parallel or substantially in parallel to the length direction and the lamination direction is defined as an LT cross section. A cross section in parallel or substantially in parallel to the width direction and the length direction is defined as a WL cross section. When viewed in the WT cross section, each of the external electrodes includes a WT main surface horizontal portion, a WT lateral surface horizontal portion, and a WT shoulder portion connecting the WT main surface horizontal portion and the WT lateral surface horizontal portion. A relationship of a length in the width direction of the WT main surface horizontal portion to a length in the width direction of each of the external electrodes is in a range of about 0.26 or more and about 0.56 or less. A relationship of a length in the lamination direction of the WT lateral surface horizontal portion to a length in the lamination direction of each of the external electrodes is in a range of about 0.26 or more and about 0.56 or less. The WT main surface horizontal portion is located farther outward from the main surface than the WT shoulder portion. The WT lateral surface horizontal portion is located farther outward from the lateral surface than the WT shoulder portion. When viewed in the LT cross section, each of the external electrodes includes an LT main surface horizontal portion, an LT lateral surface horizontal portion, an LT shoulder portion connecting the LT main surface horizontal portion and the LT lateral surface horizontal portion, and an LT non-horizontal portion connecting the LT main surface horizontal portion and the multilayer body. A relationship of a length in the length direction of the LT main surface horizontal portion to a length in the length direction of each of the external electrodes is in a range of about 0.26 or more and about 0.56 or less. The LT main surface horizontal portion is located farther outward from the main surface than the LT shoulder portion and the LT non-horizontal portion, when viewed in the WL cross section, each of the external electrodes includes a WL lateral surface horizontal portion, a WL end surface horizontal portion, a WL shoulder portion connecting the WL lateral surface horizontal portion and the WL end surface horizontal portion, and a WL non-horizontal portion connecting the WL lateral surface horizontal portion and the multilayer body. A relationship of a length of the WL lateral surface horizontal portion to a length in the length direction of each of the external electrodes is in a range of about 0.26 and about 0.56 or less. The WL lateral surface horizontal portion is located farther outward from the lateral surface than the WL shoulder portion and the WL non-horizontal portion.

According to example embodiments of the present invention, it is possible to provide multilayer ceramic capacitors that are each able to improve stability when mounted on a substrate and reduce or prevent contact of a housing with multilayer ceramic capacitors.

The above and other elements, features, steps, characteristics and advantages of the present invention will become more apparent from the following detailed description of the example embodiments with reference to the attached drawings.

BRIEF DESCRIPTION OF THE DRAWINGS

FIG. 4 is a schematic view of a WT cross section of an external electrode.

DETAILED DESCRIPTION OF THE EXAMPLE EMBODIMENTS

Figure 1:
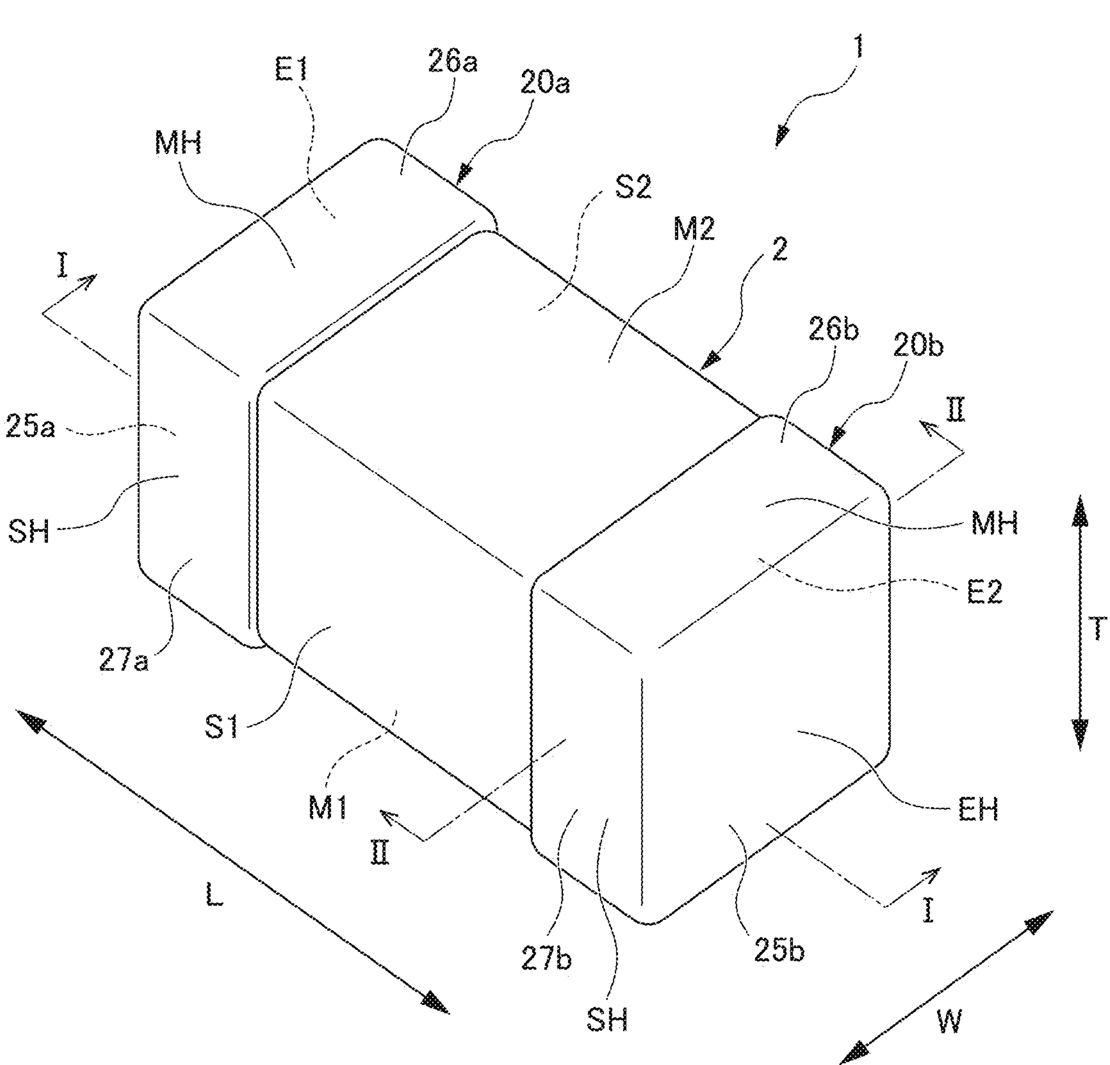
FIG. 1 is a perspective view of a multilayer ceramic capacitor according to an example embodiment of the present invention.

Hereinafter, example embodiments of the present invention will be described with reference to the accompanying drawings. In the drawings, the same or corresponding portions are denoted by the same reference numerals.

Outer Shape of Multilayer Ceramic Capacitor

An outline of the appearance of a multilayer ceramic capacitor 1 according to an example embodiment of the present invention will be described with reference to FIG. 1. FIG. 1 is a perspective view of the multilayer ceramic capacitor 1 according to the present example embodiment of the present invention. The multilayer ceramic capacitor 1 includes a multilayer body 2 and external electrodes 20. The external electrodes 20 include a first external electrode 20*a* and a second external electrode 20*b*.

Definition of Directions

Figure 2:
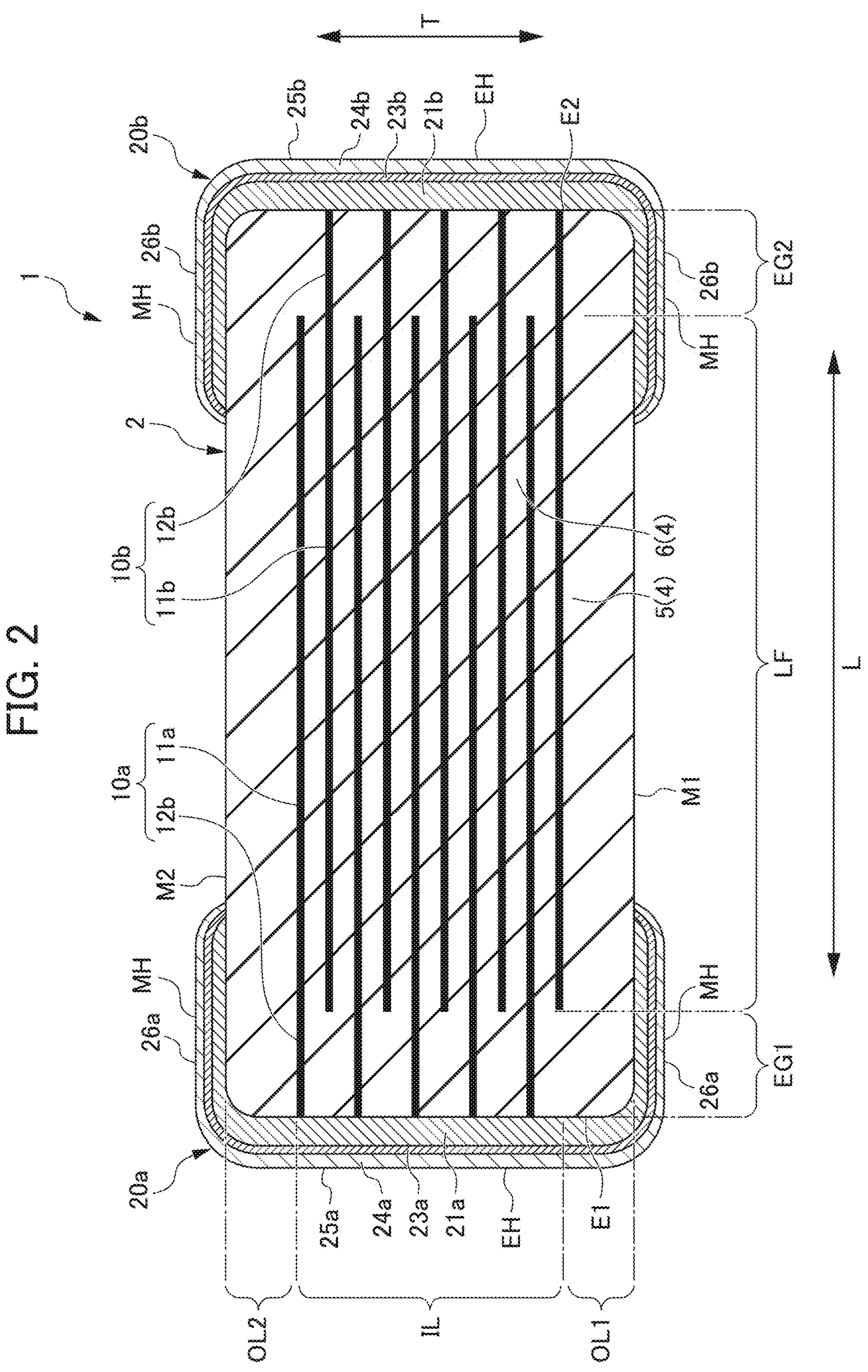
FIG. 2 is a cross-sectional view taken along the line I-I of FIG. 1.
Figure 3:
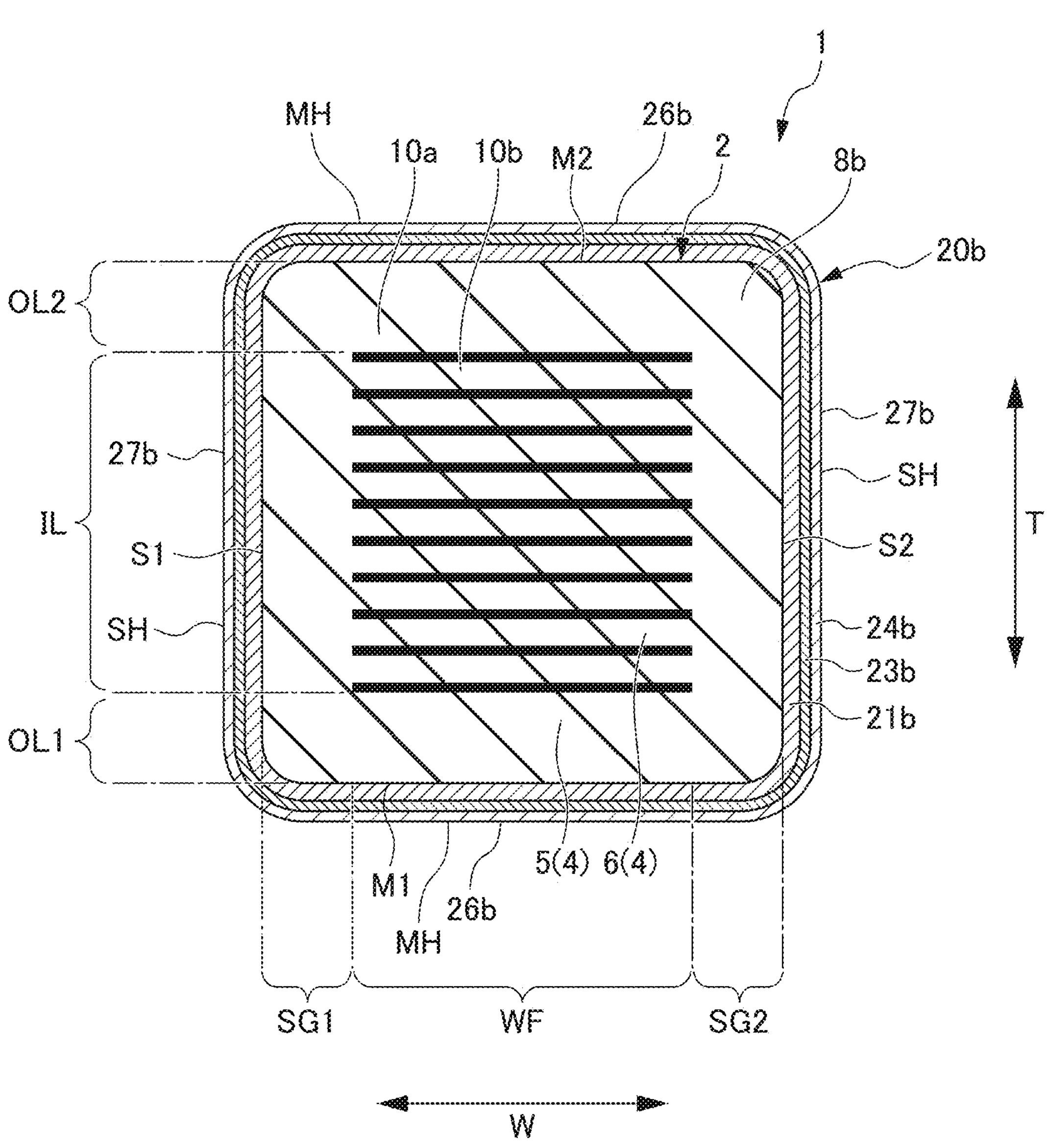
FIG. 3 is a cross-sectional view taken along the line II-II of FIG. 1.

In FIGS. 1 to 7, the L direction, the W direction, and the T direction are shown. The L direction refers to the length direction L of the multilayer ceramic capacitor 1. The W direction refers to the width direction W of the multilayer ceramic capacitor 1. The T direction refers to the lamination or stacking direction T of the multilayer ceramic capacitor 1. Accordingly, the cross section shown in FIG. 2 is referred to as an LT cross section, and the cross section shown in FIG. 3 is referred to as a WT cross section. The length direction L, the width direction W, and the lamination direction T are not necessarily orthogonal to each other. The length direction L, the width direction W, and the lamination direction T may be in a relationship intersecting each other.

Outer Shape of Multilayer Body

As shown in FIG. 1, the multilayer body 2 has a rectangular or substantially rectangular parallelepiped shape. The multilayer body includes two main surfaces M, two end surfaces E, and two lateral surfaces S. The main surfaces M are opposed to each other in the lamination direction T. The end surfaces E are opposed to each other in the longitudinal direction L. The lateral surfaces S are opposed to each other in the width direction W. The two main surfaces M include a first main surface M1 and a second main surface M2. The two end surfaces E include a first end surface E1 and a second end surface E2. The two lateral surfaces S include a first lateral surface S1 and a second lateral surface S2.

Ridge portions and corner portions of the multilayer body 2 are preferably rounded. Each of the ridge portions refers to a portion where two surfaces of the multilayer body 2 intersect with each other. Each of the corner portions refers to a portion where three surfaces of the multilayer body 2 intersect with each other.

Size of Multilayer Body

The size of the multilayer body 2 is not particularly limited. As one example, the length of the multilayer body 2 in the length direction L may be about 0.05 mm or more and about 1.00 mm or less. The length of the multilayer body 2 in the lamination direction T may be about 0.10 mm or more and about 0.50 mm or less. The length of the multilayer body 2 in the width direction W may be about 0.10 mm or more and about 0.50 mm or less. The length of each portion of the multilayer body 2 can be measured with a micrometer or an optical microscope. The length in the length direction L may not necessarily be longer than the length in the width direction W.

Horizontal Portion of External Electrode

In the multilayer ceramic capacitor 1 of the present example embodiment, each of the external electrodes 20 includes horizontal portions H, each having a predetermined shape. Specifically, each of the external electrodes 20 includes main surface horizontal portions MH, lateral surface horizontal portions SH, and an end surface horizontal portion EH in the external electrode 20. These horizontal portions H will be described later.

Internal Configuration of Multilayer Body

The internal configuration of the multilayer body 2 will be described with reference to FIG. 2. FIG. 2 is a cross-sectional view taken along the line I-I of the multilayer ceramic capacitor shown in FIG. 1. The multilayer body 2 includes a plurality of dielectric layers 4 and a plurality of internal electrode layers 10. The plurality of dielectric layers 4 and the plurality of internal electrode layers 10 are laminated on each other in the lamination direction T.

Inner Layer Portion and Outer Layer Portion

The multilayer body 2 includes an inner layer portion IL and outer layer portions OL in the lamination direction T. The outer layer portions OL include a first outer layer portion OL1 and a second outer layer portion OL2. The first outer layer portion OL1 and the second outer layer portion OL2 sandwich the inner layer portion IL in the lamination direction T.

The inner layer portion IL includes a portion of the plurality of dielectric layers 4 and a plurality of internal electrode layers 10. In the inner layer portion IL, a plurality of internal electrode layers 10 are opposed to one another with the dielectric layer 4 interposed therebetween. The inner layer portion IL is a portion in which capacitance is generated and substantially defines and functions as a capacitor. Therefore, the inner layer portion IL is also referred to as an effective portion.

The first outer layer portion OL1 is provided adjacent to the first main surface M1 of the multilayer body 2. The second outer layer portion OL2 is provided adjacent to the second main surface M2 of the multilayer body 2. Specifically, the first outer layer portion OL1 is provided between the first main surface M1 and the internal electrode layer 10 closest to the first main surface M1 among the plurality of internal electrode layers 10. The second outer layer portion OL2 is provided between the second main surface M2 and the internal electrode layer 10 closest to the second main surface M2 among the plurality of internal electrode layers 10. The first outer layer portion OL1 and the second outer layer portion OL2 do not include any of the internal electrode layers 10. The first outer layer portion OL1 and the second outer layer portion OL2 each include the remaining dielectric layers 4 excluding the dielectric layers 4 of the inner layer portion IL among the plurality of dielectric layers 4. The first outer layer portion OL1 and the second outer layer portion OL2 define and function as protective layers of the inner layer portion IL.

Dielectric Layer

The dielectric layers 4 include outer dielectric layers 5 and inner dielectric layers 6.

Outer Dielectric Layers

The outer dielectric layers 5 define the first outer layer portion OL1 and the second outer layer portion OL2 among the dielectric layers 4. One of the outer dielectric layers 5 is provided between the first main surface M1 and the internal electrode layer 10 closest to the first main surface M1, and the other of the outer dielectric layers is provided between the second main surface M2 and the internal electrode layer 10 closest to the second main surface M2.

Inner Layer Dielectric Layer

The inner dielectric layers 6 refer to the dielectric layers that are located between the internal electrode layers 10 and define the inner layer portion IL together with the internal electrode layers 10. Each of the inner dielectric layers 6 is provided between the first internal electrode layer 10*a* and the second internal electrode layer 10*b* described below.

Number of Dielectric Layers

The number of dielectric layers 4 laminated on the multilayer body 2 can be, for example, 10 or more and 2000 or less. The number of dielectric layers 4 includes the number of outer dielectric layers 5 and the number of inner dielectric layers 6.

Thickness of Dielectric layer

The thickness of each of the outer dielectric layers 5 among the dielectric layer 4 can be, for example, about 10 μm or more and about 100 μm or less. The thickness of each of the inner dielectric layers 6 can be, for example, about 0.8 μm or more and about 3.0 μm or less.

Material of Dielectric Layer

The material of each of the dielectric layers 4 may be a dielectric ceramic including, for example, $BaTiO_3$, $CaTiO_3$, $SrTiO_3$, $CaZrO_3$, or $TiO_2$. The dielectric layer 4 may include, for example, a Mn compound, a Fe compound, a Cr compound, a Co compound, a Ni compound, or the like with the dielectric ceramic in an amount smaller than that of the main component.

Internal Electrode Layer

The internal electrode layers 10 include first internal electrode layers 10*a* and second internal electrode layers 10*b*. The first internal electrode layers 10*a* are connected to the first external electrode 20*a*. The second internal electrode layers 10*b* are connected to the second external electrode 20*b*. Each of the first internal electrode layers 10*a* extends from the first end surface E1 toward the second end surface E2. Each of the second internal electrode layers 10*b* extends from the second end surface E2 toward the first end surface E1.

Counter Portion and Extension Portion

The first internal electrode layers 10*a* and the second internal electrode layers 10*b* each include a counter electrode portion 11 and an extension electrode portion 12. Each of the counter electrode portions 11 is a portion of the internal electrode layer 10 at which the first internal electrode layer 10*a* and the second internal electrode layer 10*b* are opposed to each other in the lamination direction T. Each of the extension electrode portions 12 is a portion of the internal electrode layer 10 extending from the counter electrode portion 11 toward the end surface E1 or toward the end surface E2 of the multilayer body 2.

Each of the counter electrode portions 11 of the first internal electrode layers 10*a* is referred to as a first counter electrode portion 11*a*, and each of the extension electrode portions 12 of the first internal electrode layers 10*a* is referred to as a first extension electrode portion 12*a*. Each of the first extension electrode portions 12*a* is a portion extending from the first counter electrode portion 11*a* to the first end surface E1 of the multilayer body 2. Similarly, each of the counter electrode portions 11 of the second internal electrode layer 10*b* is referred to as a second counter electrode portion 11*b*, and the extension electrode portion 12 of the second internal electrode layer 10*b* is referred to as a second extension electrode portion 12*b*. The second extension electrode portion 12*b* is a portion extending from the second counter electrode portion 11*b* to the second end surface E2 of the multilayer body 2.

Number of Internal Electrode Layers

The number of the internal electrode layers 10 may be, for example, 10 or more and 1000 or less. The number of the internal electrode layers 10 is a number including the number of the first internal electrode layers 10*a* and the number of the second internal electrode layers 10*b*.

Thickness of Internal Electrode Layer

A thickness of each of the internal electrode layers 10 can be, for example, about 0.3 μm or more and about 0.4 μm or less.

Material of Internal Electrode Layer

The material of the internal electrode layers 10 may be, for example, a metal such as Ni, Cu, Ag, Pd, or Au, an alloy of Ni and Cu, or an alloy of Ag and Pd. The material of the internal electrode layers 10 may further include, for example, dielectric particles of the same composition as the ceramic contained in the dielectric layer 4.

Electrode Counter Portion

The segmentation of the multilayer body 2 in the length direction L will be described. The multilayer body 2 includes an electrode counter portion LF and end gap portions EG in the length direction L. The end gap portions EG include a first end gap portion EG1 and a second end gap portion EG2. The electrode counter portion LF is a portion where the first internal electrode layers 10*a* and the second internal electrode layers 10*b* are opposed to each other in the lamination direction T. That is, the electrode counter portion LF is a portion where the first counter electrode portions 11*a* and the second counter electrode portions 11*b* are opposed to each other in the lamination direction T. The electrode counter portion LF is located in the middle portion in the length direction L of the multilayer body 2. The electrode counter portion LF is a portion where capacitance is generated and substantially defines and functions as a capacitor. Thus, the electrode counter portion LF is also referred to as an effective portion.

End Gap Portion

Each of the end gap portions EG is a portion where the first internal electrode layers 10*a* and the second internal electrode layers 10*b* are not opposed to each other in the lamination direction T. Specifically, in the lamination direction T, a portion where the first internal electrode layers 10*a* are provided and the second internal electrode layers 10*b* are not provided is the first end gap portion EG1. Similarly, a portion where the second internal electrode layers 10*b* are provided and the first internal electrode layers 10*a* are not provided is the second end gap portion EG2.

The first end gap portion EG1 corresponds to a portion where the first extension electrode portions 12*a* are provided, and the second end gap portion EG2 corresponds to a portion where the second extension electrode portions 12*b* are provided. The first end gap portion EG1 defines and functions as an extension electrode to the first end surface E1 of each of the first internal electrode layers 10*a*, and the second end gap portion EG2 defines and functions as an extension electrode to the second end surface E2 of each of the second internal electrode layers 10*b*. Since each of the end gap portions EG is a segment in the length direction L, it is also referred to as an L gap.

The length of each of the end gap portions EG in the length direction L may be, for example, about 5 μm or more and about 30 μm or less.

External Electrode

Each of the external electrodes includes a first external electrode 20*a* and a second external electrode 20*b*.

First External Electrode

The first external electrode 20*a* is provided on the first end surface E1 of the multilayer body 2. The first external electrode 20*a* is electrically connected to the first internal electrode layers 10*a*.

Second External Electrode

The second external electrode 20*b* is provided on the second end surface E2 of the multilayer body 2. The second external electrode 20*b* is electrically connected to the second internal electrode layers 10*b*.

External Electrode on Each Surface

Each of the external electrodes 20 extends from a corresponding one of the end surfaces E to a portion of the each of two main surfaces M and a portion of each of the two lateral surfaces S. A portion of the external electrode 20 provided on the end surface E is referred to as an end surface external electrode 25. A portion of the external electrode 20 provided on a portion of each of the main surfaces M is referred to as a main surface external electrode 26. A portion of the external electrode 20 provided on a portion of each of the lateral surfaces S is referred to as a lateral surface external electrode 27.

Specifically, a portion of the first external electrode 20*a* provided on the first end surface E1 is referred to as a first end surface external electrode 25*a*. In the first external electrode 20*a*, a portion provided on a portion of the first main surface M1 or a portion provided on the second main surface M2 is referred to as a first main surface external electrode 26*a*. In the first external electrode 20*a*, a portion provided on a portion of the first lateral surface S1 or a portion of the second lateral surface S2 is referred to as a first lateral surface external electrode 27*a*.

Similarly to the first external electrode 20*a*, in the second external electrode 20*b*, a portion provided on a portion of the second end surface E2 is referred to as a second end surface external electrode 25*b*. In the second external electrode 20*b*, a portion provided on a portion of the first main surface M1 or a portion of the second main surface M2 is referred to as a second main surface external electrode 26*b*. In the second external electrode 20*b*, a portion provided on a portion of the first lateral surface S1 or a portion of the second lateral surface S2 is referred to as a second lateral surface external electrode 27*b*.

Horizontal Portion of External Electrode

The main surface horizontal portion MH is provided on each of the first main surface external electrode 26*a* and the second main surface external electrode 26*b*. The end surface horizontal portion EH is provided on each of the first end surface external electrode 25*a* and the second end surface external electrode 25*b*.

Layer Configuration of External Electrode

The layer configuration of each of the external electrodes 20 will be described with reference to FIG. 2. Each of the external electrodes 20 includes, for example, a base electrode layer 21, an inner plated layer 23, and a surface plated layer 24. These layers are provided in the order of the base electrode layer 21, the inner plated layer 23, and the surface plated layer 24 from the end surface E of the multilayer body 2. Specifically, the first external electrode 20*a* includes a first base electrode layer 21*a*, a first inner plated layer 23*a*, and a first surface plated layer 24*a*. Similarly, the second external electrode 20*b* includes a second base electrode layer 21*b*, a second inner plated layer 23*b*, and a second surface plated layer 24*b*. In the description of the external electrode 20, a direction away from the end surface E of the multilayer body 2 may be referred to as an up direction. For example, with regard to the base electrode layer 21 and the resin electrode layer 22 described above, the resin electrode layer 22 may be described as being provided on the base electrode layer 21.

Base Electrode Layer

The first base electrode layer 21*a* is provided on the first end surface E1 of the multilayer body 2 and covers the first end surface E1. The first base electrode layer 21*a* may extend from the first end surface E1 to a portion of the first main surface M1, a portion of the second main surface M2, a portion of the first lateral surface S1, and a portion of the second lateral surface S2.

Similarly, the second base electrode layer 21*b* is provided on the second end surface E2 of the multilayer body 2 and covers the second end surface E2. The second base electrode layer 21*b* may extend from the second end surface E2 to a portion of the first main surface M1, a portion of the second main surface M2, a portion of the first lateral surface S1, and a portion of the second lateral surface S2.

Fired Layer

The base electrode layer 21 may be, for example, a fired layer including metal and glass. The fired layer is obtained by, for example, applying an electrically conductive paste including a metal and glass to a multilayer body by a dipping method, and firing the paste. The firing for forming the fired layer may be performed after the firing of the internal electrode layer, or may be performed simultaneously with the firing of the internal electrode layer. The fired layer may include a plurality of layers.

The metal included in the fired layer includes, for example, Cu as a main component. The metal may include, for example, at least one selected from a metal such as Ni, Ag, Pd, or Au or an alloy such as an Ag—Pd alloy as a main component, or may include the metal as a component other than the main component.

Examples of the glass included in the fired layer include a glass component including at least one selected from B, Si, Ba, Mg, Al, Li, and the like. As a specific example, borosilicate glass may be used.

The base electrode layer 21 may be, for example, a resin layer including electrically conductive particles and a thermosetting resin. The resin layer may be provided on the above-described fired layer, or may be directly formed on the multilayer body without forming the fired layer.

The resin layer is obtained by, for example, applying an electrically conductive paste containing electrically conductive particles and a thermosetting resin to a multilayer body by a coating method, and firing the paste. The internal electrode layers may be fired after firing, or may be fired simultaneously with firing of the internal electrode layers. The resin layer may include a plurality of layers.

The thickness per one layer of the base electrode layer 21 defining and functioning as the fired layer or the resin layer is not particularly limited, and may be, for example, about 1 μm or more and about 10 μm or less.

The base electrode layer 21 is formed by a thin film forming method such as, for example, sputtering or vapor deposition, and may be a thin film layer having a thickness of 1 μm or less on which metal particles are deposited.

Inner Plated Layer

The inner plated layer 23 is provided on the base electrode layer 21 and covers at least a portion of the base electrode layer 21. The inner plated layer 23 includes, for example, at least one selected from metals such as Cu, Ni, Ag, Pd, and Au, and alloys such as an Ag—Pd alloy.

Surface Plated Layer

The surface plated layer 24 is provided on the inner plated layer 23 and covers at least a portion of the inner plated layer 23. The surface plated layer 24 includes, for example, a metal such as Sn.

The inner plated layer 23 is, for example, preferably a Ni plated layer, and the surface plated layer 24 is preferably a Sn plated layer. The Ni plated layer can prevent the base electrode layer from being eroded by solder when the ceramic electronic component is mounted. The Sn plated layer can improve wettability of solder when mounting a ceramic electronic component, and thus facilitate mounting. When the surface plated layer 24 is a Sn plated layer, the wettability of the solder with respect to the external electrode 20 can be improved.

Internal Configuration of Multilayer Body (WT Cross-Section)

The internal configuration of the multilayer body 2, particularly the internal configuration viewed from the second end surface E2, will be described with reference to FIG. 3. FIG. 3 is a cross-sectional view taken along the line II-II of the multilayer ceramic capacitor shown in FIG. 1. The multilayer body 2 includes an electrode counter portion WF in which the internal electrode layers 10 are opposed to each other in the width direction W, and side gap portions SG. The side gap portions SG include a first side gap portion SG1 and a second side gap portion SG2. The first side gap portion SG1 and the second side gap portion SG2 sandwich the electrode counter portion WF. The first side gap portion SG1 is located between the electrode counter portion WF and the first lateral surface S1, and the second side gap portion SG2 is located between the electrode counter portion WF and the second lateral surface S2.

Specifically, the first side gap portion SG1 is located between the end of the internal electrode layers 10 adjacent to the first lateral surface S1 and the first lateral surface S1, and the second side gap portion SG2 is located between the end of the internal electrode layer 10 adjacent to the second lateral surface S2 and the second lateral surface S2. The first side gap portion SG1 and the second side gap portion SG2 do not include the internal electrode layers 10, and include only the dielectric layer 4. Each of the first side gap portion SG1 and the second side gap portion SG2 function as a protective layer of the internal electrode layers 10. Since each of the side gap portions SG is a section in the width direction W, it is also referred to as a W gap.

The length of each of the side gap portions SG in the width direction W can be set to, for example, about 1/10 or 5 μm or more and about 30 μm or less of the length of the multilayer body 2 in the width direction W.

Horizontal Portion of External Electrode

Each of the main surface horizontal portions MH described above is provided on the first main surface external electrode 26*a* and the second main surface external electrode 26*b*, similarly to the description based on FIG. 2 described above. Further, each of the lateral surface horizontal portions SH is provided on the first lateral surface external electrode 27*a* and the second lateral surface external electrode 27*b*.

Size of Multilayer Ceramic Capacitor

The length in the length direction L of the entire multilayer ceramic capacitor 1 including the multilayer body 2 and the external electrode 20 may be, for example, about 0.2 mm or more and about 2.0 mm or less. The length of the entire multilayer ceramic capacitor 1 in the lamination direction T may be, for example, about 0.1 mm or more and about 1.2 mm or less. The length of the entire multilayer ceramic capacitor 1 in the width direction W may be, for example, about 0.1 mm or more and about 1.2 mm or less.

In the present example embodiment, the multilayer ceramic capacitor 1 is, for example, a two-terminal capacitor. The multilayer ceramic capacitor 1 is not limited to a two-terminal capacitor, and may be a capacitor having three or more terminals.

Shape of External Electrode

In the multilayer ceramic capacitor 1 of the present example embodiment, horizontal portion H exists in the external electrode 20. The length of each of the horizontal portions H satisfies a predetermined ratio. In addition, a portion of the external electrode 20 other than the horizontal portions H is present at a position lower than the horizontal portions H, that is, at a position closer to the inside of the multilayer body 2 than the horizontal portions H. With such a configuration, in the multilayer ceramic capacitor 1 of the present example embodiment, it is possible to improve stability when mounted on a substrate. Further, in the multilayer ceramic capacitor 1 of the present example embodiment, it is possible to reduce or prevent contact of a housing with the multilayer ceramic capacitor 1.

Description of Terms

In the following description, in addition to the horizontal portions H, shoulder portions C, non-horizontal portions N and multilayer body shoulder portions K are provided. The horizontal portions H include main surface horizontal portions MH, lateral surface horizontal portions SH, and end surface horizontal portions EH. The main surface horizontal portions MH include WT main surface horizontal portions MH1 and LT main surface horizontal portions MH2. The lateral surface horizontal portions SH include WT lateral surface horizontal portions SH1 and WL lateral surface horizontal portions SH3. The end surface horizontal portions EH include LT surface end surface horizontal portions EH2 and WL surface end surface horizontal portions EH3. The shoulder portions C include WT shoulder portions C1, LT shoulder portion C2, and WL shoulder portions C3. The non-horizontal portions N include LT non-horizontal portions N1 and WL non-horizontal portions N2. Multilayer body shoulder portions K include WT multilayer body shoulder portions K1, LT multilayer body shoulder portions K2, and WL multilayer body shoulder portions K3.

Figure 4:
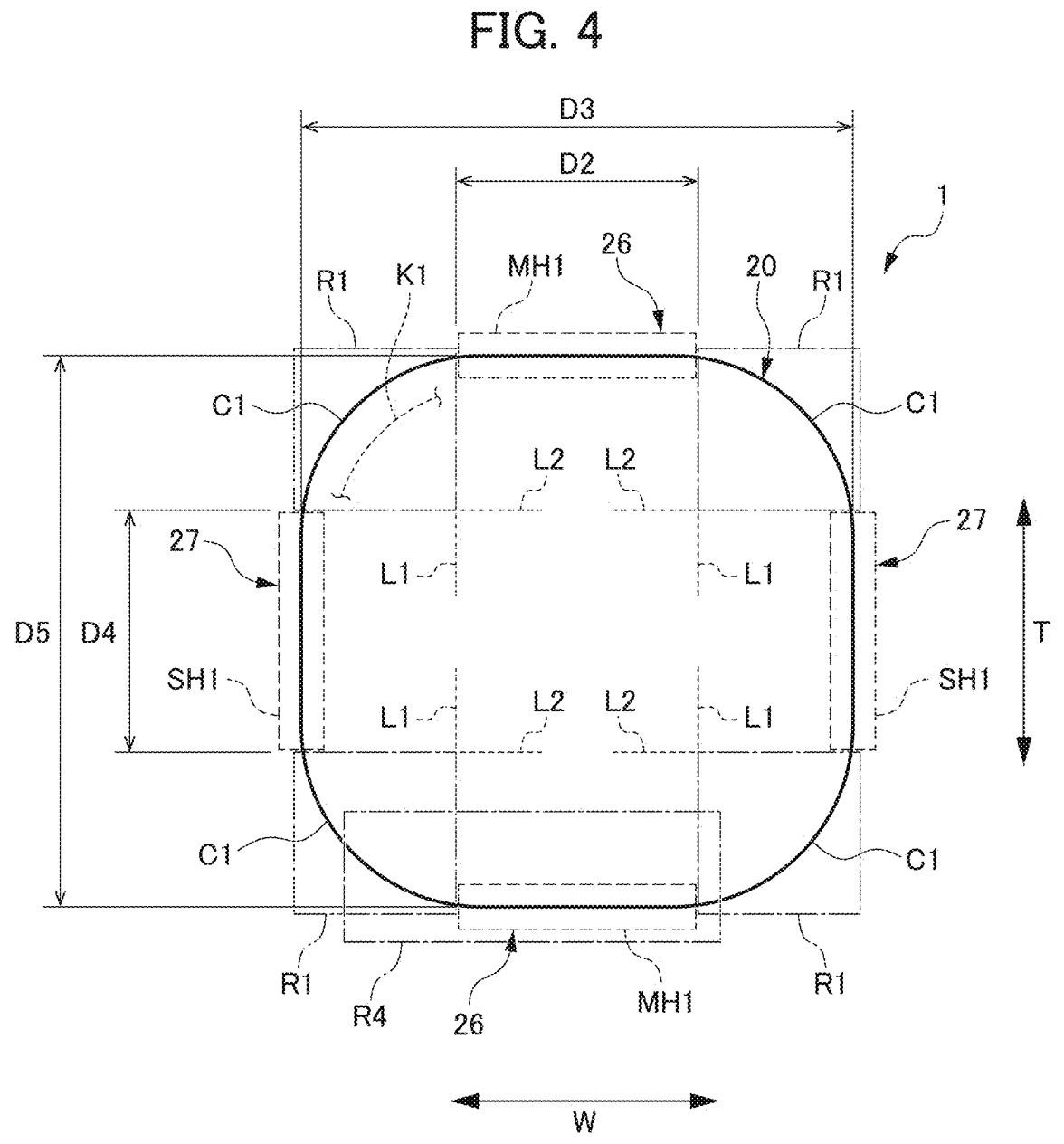
Figure 6:
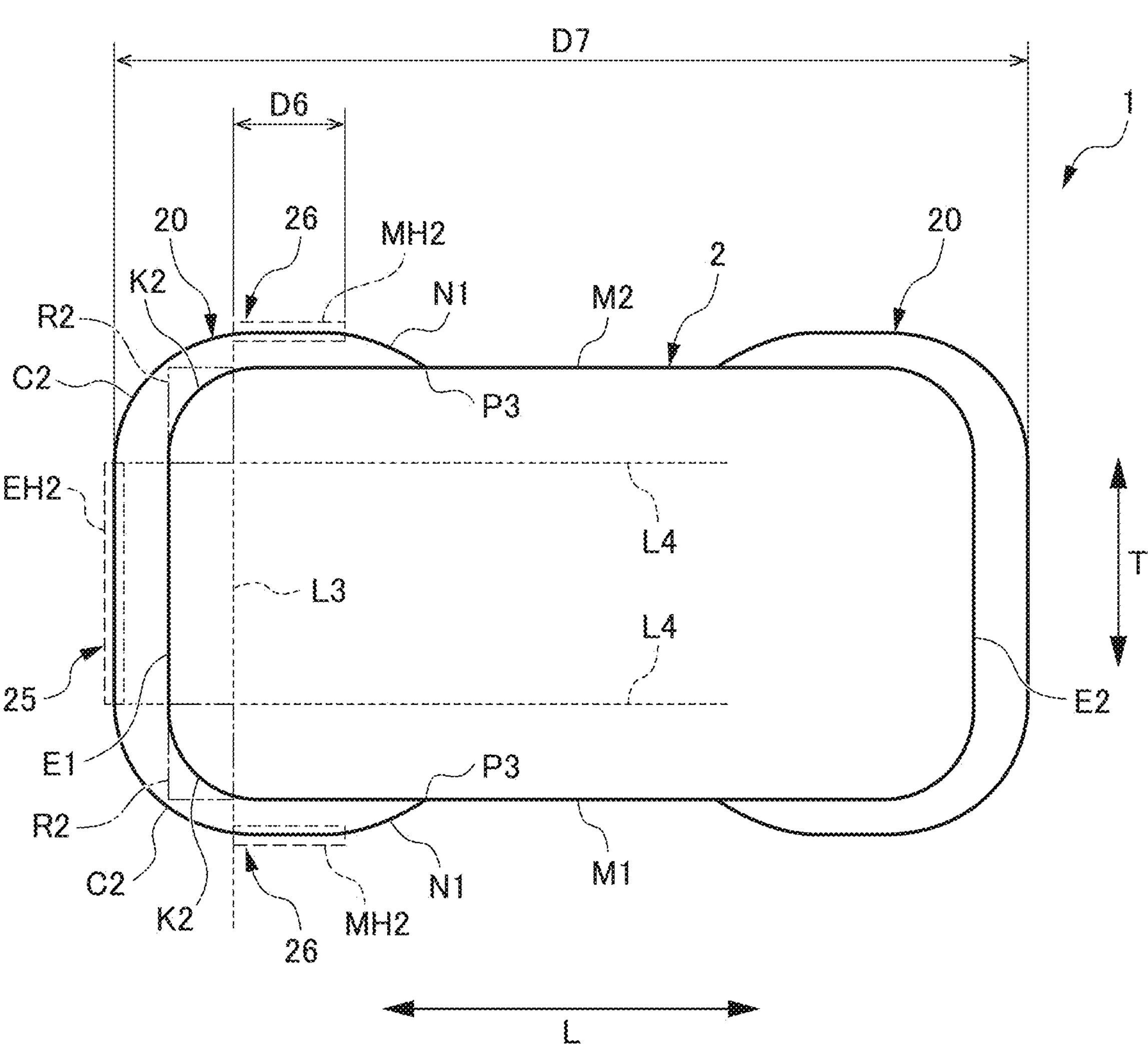
FIG. 6 is a schematic view of an LT cross section of a multilayer ceramic capacitor according to an example embodiment of the present invention.
Figure 7:
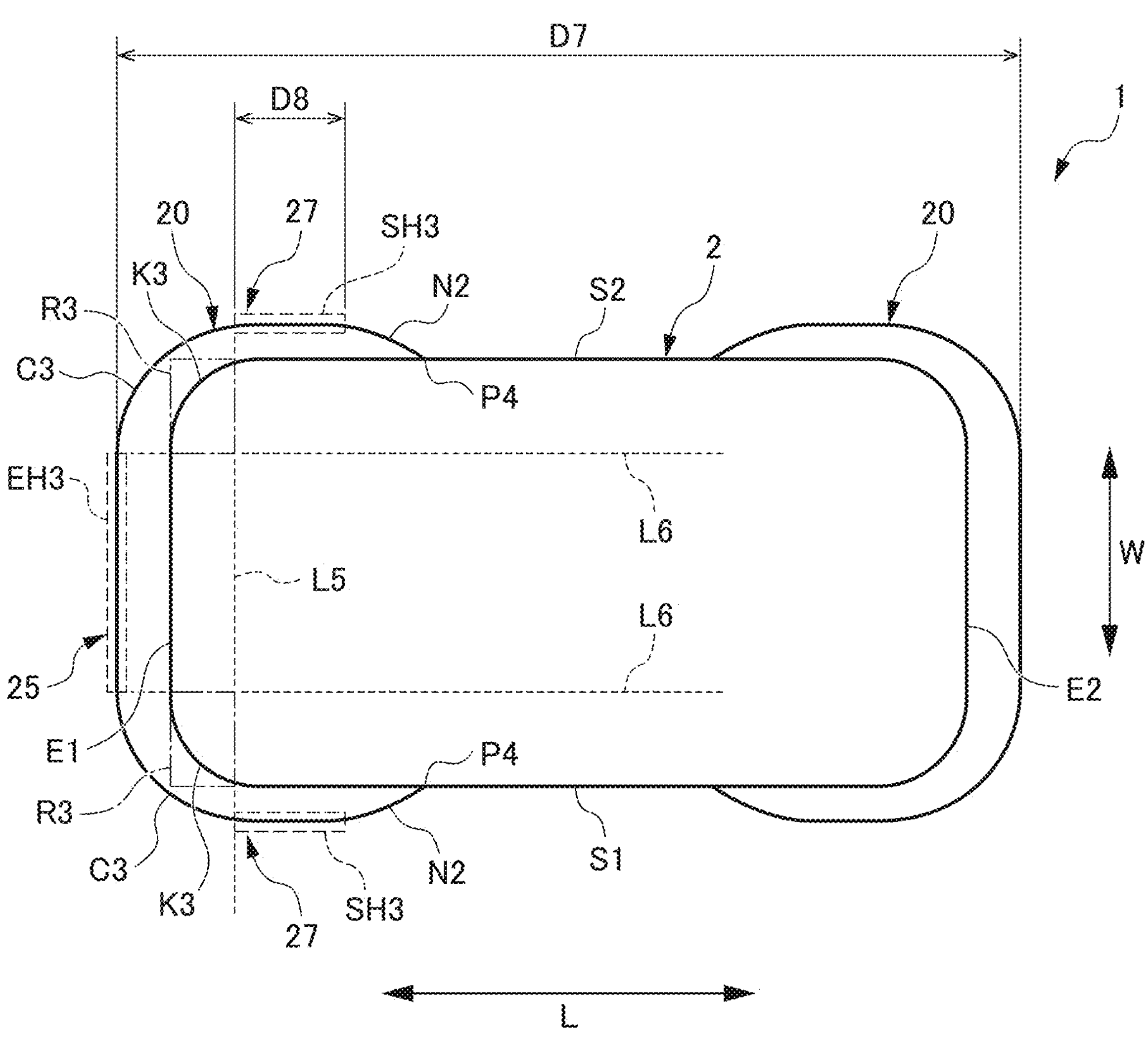
FIG. 7 is a schematic view of an LW cross section of a multilayer ceramic capacitor according to an example embodiment of the present invention.

First, an outline of the horizontal portions H and the like will be described with reference to the drawings. FIG. 4 is a schematic view of a WT cross section of the external electrode 20. FIG. 6 is a schematic view of an LT cross section of the multilayer ceramic capacitor 1. FIG. 7 is a schematic view of an LW cross section of the multilayer ceramic capacitor 1.

WT Cross Section

The WT cross section will be described with reference to FIG. 4.

Horizontal Portion

Each of the external electrodes 20 includes the WT main surface horizontal portions MH1 in the main surface external electrode 26. The WT main surface horizontal portions MH1 are respectively provided on the first main surface M1 and the second main surface M2 (shown in FIG. 1) of the multilayer body 2. Therefore, two WT main surface horizontal portions MH1 are included in the WT cross section. The WT main surface horizontal portions MH1 each include a portion horizontal or substantially horizontal relative to the main surface M of the multilayer body 2.

In addition, the external electrodes 20 each include WT lateral surface horizontal portions SH1 in the lateral surface external electrode 27. The WT lateral surface horizontal portion SH1 is provided on each of the first lateral surface S1 and the second lateral surface S2 (shown in FIG. 1) of the multilayer body 2. Therefore, two WT lateral surface horizontal portions SH1 are included in the WT cross section. The WT lateral surface horizontal portion a SH1 includes portion horizontal or substantially horizontal relative to the lateral surface S of the multilayer body 2. The details of the horizontal portions H will be described later with reference to FIG. 5.

Shoulder Portion

Each of the external electrodes 20 includes WT shoulder portions C1. Each of the WT shoulder portions C1 is a portion connecting the WT main surface horizontal portion MH1 and the WT lateral surface horizontal portion SH1. Specifically, each of the WT shoulder portions C1 is the external electrode 20 present in a corresponding one of the corner regions R1 shown in FIG. 4. Each of the corner regions R1 is a region defined by one of the lines L1 and one of the lines L2. Each of the lines L1 extends in parallel or substantially in parallel to the lamination direction T from an end portion of the WT main surface horizontal portion MH1 in the width direction W. Each of the lines L2 extends in parallel or substantially in parallel to the width direction W from an end portion of the WT lateral surface horizontal portion SH1 in the lamination direction T. The WT shoulder portions C1 are respectively present in the four ridge portions of the multilayer body 2. Therefore, four WT shoulder portions C1 are included in the WT cross section.

Details of Horizontal Portion

Figure 5:
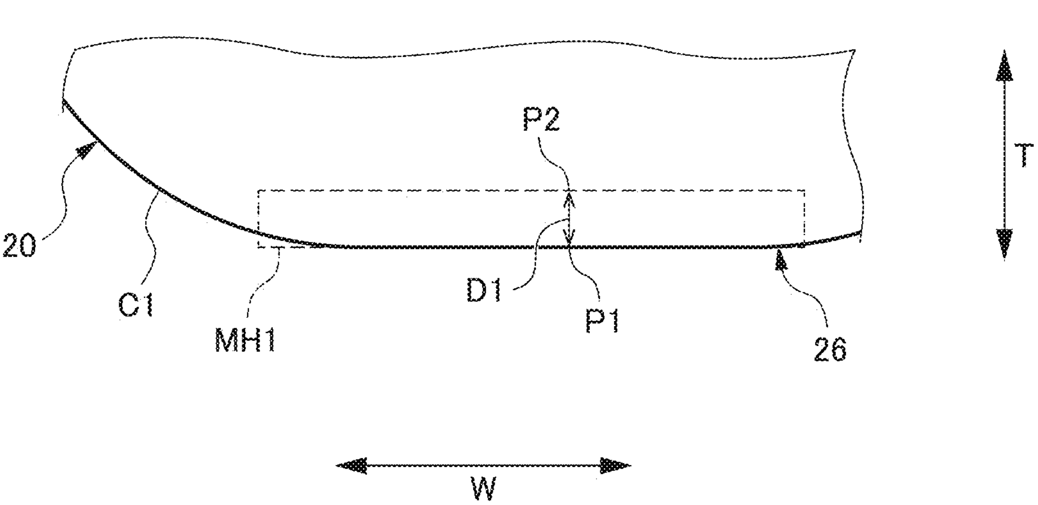
FIG. 5 is a diagram for explaining a horizontal portion.

The horizontal portion H will be described with reference to FIG. 5. FIG. 5 is an enlarged view of the WT cross section for explaining one of the horizontal portions H. FIG. 5 is an enlarged view of a region R4 in FIG. 4. That is, FIG. 5 shows one of the WT main surface horizontal portions MH1 in an enlarged manner. A point P1 shown in FIG. 5 indicates a position of the external electrode 20 closest to the first main surface M1 in the WT cross section. In other words, the point P1 indicates the outermost position of the external electrode 20 adjacent to the first main surface M1 in the WT cross section. A point P2 shown in FIG. 5 indicates a position advanced from the point P1 in the direction of the inside of the multilayer body 2 in parallel or substantially in parallel to the lamination direction T by the length D1. The WT main surface horizontal portion MH1 is the external electrode 20 located between the point P1 and the point P2. More specifically, the WT main surface horizontal portion MH1 is the external electrode 20 located between a line passing through the point P1 and parallel to the first main surface M1 and a line passing through the point P2 and parallel or substantially parallel to the first main surface M1 in the WT cross section. The aforementioned length D1 may be, for example, about 0.5 μm or more and about 3 μm or less.

The horizontal portion H in the above description is described by taking the WT main surface horizontal portion MH1 as an example. The description also applies to the other horizontal portions H. That is, each of the horizontal portions H refers to the external electrode 20 belonging to a range from a point closest to each surface in the external electrode 20 to a position advanced in the direction of the inside of the multilayer body 2 by a predetermined distance from the point. Hereinafter, the above-described predetermined distances in the above-described six horizontal portions H will be described.

The WT main surface horizontal portion MH1 extends inward from an outermost point from the main surface M of the external electrode 20 in the WT cross section by, for example, about 0.5 μm or more and about 3.0 μm or less. The WT lateral surface horizontal portion SH1 extends inward from an outermost point from the lateral surface S of the external electrode 20 in the WT cross section by, for example, about 0.5 μm or more and about 3.0 μm or less. The LT main surface horizontal portion MH2 extends inward from an outermost point from the main surface M of the external electrode 20 in the LT cross section by, for example, about 0.5 μm or more and about 2.5 μm or less. The LT end surface horizontal portion EH2 extends inward from an outermost point from the end surface E of the external electrode 20 in the LT cross section by, for example, about 0.5 μm or more and about 4.0 μm or less. The WL lateral surface horizontal portion SH3 extends inward from an outermost point from the lateral surface S of the external electrode 20 in the WT cross section by, for example, about 0.5 μm or more and about 2.5 μm or less. The WL end surface horizontal portion EH3 extends inward from an outermost point from the end surface E of the external electrode 20 in the WT cross section by, for example, about 0.5 μm or more and about 4.0 μm or less.

As described above, each of the horizontal portions H does not indicate only a horizontal portion of the external electrode 20 in a strict sense. The horizontal portion H may refer to the external electrode 20 included in the above-described range, including a horizontal portion in a strict sense.

LT Cross Section

Hereinafter, surfaces other than the WT cross section will be described. First, the LT cross section will be described. FIG. 6 is a schematic view of an LT cross section of the multilayer ceramic capacitor 1. In FIG. 6, with regard to the external electrode 20, only the external electrode 20 provided on the first end surface E1 is described in detail. However, the external electrode 20 provided on the second end surface E2 is also the same as the external electrode 20 provided on the first end surface E1.

In the LT cross section, each of the external electrodes 20 includes, as horizontal portions H, the LT main surface horizontal portions MH2 and the LT end surface horizontal portion EH2. The LT main surface horizontal portions MH2 are provided in the main surface external electrode 26 provided on the first main surface M1 and the main surface external electrode 26 provided on the second main surface M2. The LT end surface horizontal portion EH2 is provided in the end surface external electrode 25 provided on the first end surface E1.

The ranges of the LT main surface horizontal portions MH2 and the LT end surface horizontal portion EH2 are as described above. That is, each of the LT main surface horizontal portions MH2 is a portion of the external electrode 20 extending inward from a point closest to the main surface M of the external electrode 20 by a predetermined length. The LT end surface horizontal portion EH2 is a portion of the external electrode 20 extending inward from a point closest to the end surface E of the external electrode 20 by a predetermined length.

Shoulder Portion

In the LT cross section, each of the external electrodes 20 includes LT shoulder portions C2. Each of the LT shoulder portions C2 connects the LT main surface horizontal portion MH2 and the LT end surface horizontal portion EH2. Similarly to the WT shoulder portion C1 described above, each of the LT shoulder portions C2 is the external electrode 20 provided in the range defined by the lines L3 and L4 shown in FIG. 6. Here, the line L3 extends in parallel to the lamination direction T from an end portion of the LT main surface horizontal portion MH2 adjacent to the first end surface E1. Each of the lines L4 extends in parallel or substantially in parallel in the length direction L from a corresponding one of the end portions of the LT end surface horizontal portion EH2. Each of the LT shoulder portions C2 is provided in a corresponding one of the four ridge portions of the multilayer body 2. Therefore, the LT cross section includes four LT shoulder portions C2.

Non-Horizontal Portion

In the LT cross section, each of the external electrodes 20 includes LT non-horizontal portions N1. Each of the LT non-horizontal portions N1 refers to an external electrode 20 provided in a range from an end portion of the LT main surface horizontal portion MH2 adjacent to the second end surface E2 to an end portion P3 of the external electrode 20 adjacent to the second end surface E2 in the LT cross section. The LT non-horizontal portions N1 are respectively provided at the first main surface M1 and the second main surface M2 in the LT cross section.

LT Multilayer Body Shoulder Portion

Next, the LT multilayer body shoulder portions K2 will be described. Each of the LT multilayer body shoulder portions K2 refers to a corner portion of the multilayer body 2 in contact with the external electrode 20 connecting the LT main surface horizontal portion MH2 and the LT end surface horizontal portion EH2. In other words, each of the LT multilayer body shoulder portions K2 is a corner portion of the multilayer body 2 in contact with the LT shoulder portion C2.

Specifically, each of the LT multilayer body shoulder portions K2 is the multilayer body 2 provided in a corresponding one of the corner regions R2 shown in FIG. 6. Each of the corner regions R2 is a region defined by the line L3 and the lines L4 described above. The LT multilayer body shoulder portions K2 are respectively provided in the four ridge portions of the multilayer body 2. Therefore, the LT cross section includes four LT multilayer body shoulder portions K2.

WL Cross Section

Next, the WL surface will be described. FIG. 7 is a schematic view of a WL cross section of the multilayer ceramic capacitor 1. In FIG. 7, with regard to the external electrode 20, only the external electrode 20 provided on the first end surface E1 is described in detail. However, the external electrode 20 provided on the second end surface E2 is also the same or substantially the same as the external electrode 20 provided on the first end surface E1.

The configuration of the external electrodes 20 on the WL cross section is the same or substantially the same as the configuration of the external electrodes 20 on the LT cross section described above. In the WL cross section, each of the external electrodes 20 includes, as the horizontal portion H, the WL lateral surface horizontal portions SH3 and the WL end surface horizontal portion EH3. The WL lateral surface horizontal portions SH3 are respectively provided in the lateral surface external electrode 27 provided on the first lateral surface S1 and the lateral surface external electrode 27 provided on the second lateral surface S2. The WL end surface horizontal portion EH3 is provided in the end surface external electrode 25 provided on the first end surface E1.

The ranges of the WL lateral surface horizontal portions SH3 and the WL end surface horizontal portion EH3 are as described above. That is, each of the WL lateral surface horizontal portions SH3 is a portion of the external electrode 20 extending inward from a point closest to the lateral surface S of the external electrode 20 by a predetermined length. Further, the WL end surface horizontal portion EH3 is a portion of the external electrode 20 extending inward from a point closest to the end surface E of the external electrode 20 by a predetermined length.

Shoulder Portion

Further, in the WL cross section, each of the external electrodes 20 includes WL shoulder portions C3. Each of the WL shoulder portions C3 connects the WL lateral surface horizontal portions SH3 and the WL end surface horizontal portion EH3. Similarly to the WT shoulder portion C1 and the LT surface shoulder portion C2 described above, each of the WL shoulder portions C3 is the external electrode 20 provided in the range defined by the lines L5 and L6 shown in FIG. 7. Here, the line L5 extends in parallel to the width direction W from an end portion of the WL lateral surface horizontal portion SH3 adjacent to the first end surface E1. Each of the lines L6 extends in parallel in the length direction L from a corresponding one of the end portions of the WL end surface horizontal portion EH3. Each of the WL shoulder portions C3 is provided in a corresponding one of the four ridge portions of the multilayer body 2. Therefore, the WL cross section includes four WL shoulder portions C3.

Non-Horizontal Portion

In the WL cross section, each of the external electrodes 20 includes WL non-horizontal portions N2. Each of the WL non-horizontal portion N2 refers to an external electrode 20 provided in a range from an end portion of the WL lateral surface horizontal portion SH3 adjacent to the second end surface E2 to an end portion P4 of the external electrode 20 adjacent to the second end surface E2 in the WL cross section. The WL non-horizontal portions N2 are respectively provided on the first lateral surface S1 side and the second lateral surface S2 side in the WL cross section.

WL Multilayer Body Shoulder Portion

Next, the WL multilayer body shoulder portions K3 will be described. Each of the WL multilayer body shoulder portions K3 refers to a corner portion of the multilayer body 2 in contact with the external electrode 20 connecting the WL lateral surface horizontal portion SH3 and the WL end surface horizontal portion EH3. In other words, each of the WL multilayer body shoulder portions K3 is a corner portion of the multilayer body 2 in contact with the WL shoulder portion C3.

Specifically, each of the WL multilayer body shoulder portions K3 is the multilayer body 2 provided in a corresponding one of the corner regions R3 shown in FIG. 7. Each of the corner regions R3 is a region defined by the line L5 and the lines L6 described above. The WL multilayer body shoulder portions K3 are respectively provided in the four ridge portions of the multilayer body 2. Therefore, the WL cross section includes four WL multilayer body shoulder portions K3.

Features of the ceramic capacitor 1 of the present example embodiment will be described.

Feature 1

The ceramic capacitor 1 of the present example embodiment includes the following features (1-1) to (1-11) as Feature 1.

(1-1): When viewed in the WT cross section, each of the external electrodes 20 includes the WT main surface horizontal portions MH1, the WT lateral surface horizontal portions SH1, and the WT shoulder portions C1 each connecting the WT main surface horizontal portion MH1 and the WT lateral surface horizontal portion SH1.

(1-2): length D2 in the width direction W of the WT main surface horizontal portion MH1/length D3 in the width direction W of the external electrode 20 is about 0.26 or more and about 0.56 or less.

(1-3): length D4 in the lamination direction T of the WT lateral surface horizontal portion SH1/length D5 in the lamination direction T of the external electrode 20 is about 0.26 or more and about 0.56 or less.

(1-4): Each of the WT main surface horizontal portions MH1 is located farther outward from the main surface M than the WT shoulder portions C1.

(1-5): Each of the WT lateral surface horizontal portions SH1 is located farther outward from the lateral surface S than the WT shoulder portions C1.

(1-6): When viewed in the LT cross section, each of the external electrodes 20 includes the LT main surface horizontal portions MH2, the LT end surface horizontal portion EH2, the LT shoulder portions C2 each connecting the LT main surface horizontal portion MH2 and the LT end surface horizontal portion EH2, and the LT non-horizontal portions N1 each connecting the LT main surface horizontal portion MH2 and the multilayer body 2.

(1-7): length D6 in the length direction L of the LT main surface horizontal portion MH2/length D7 in the length direction L of the external electrode 20 is about 0.26 or more and about 0.56 or less.

(1-8): Each of the LT main surface horizontal portions MH2 is located farther outward from the main surface M of the external electrode 20 than the LT shoulder portion C2 and the LT non-horizontal portion N1.

(1-9): When viewed in the WL cross section, each of the external electrodes 20 includes the WL lateral surface horizontal portions SH3, the WL end surface horizontal portion EH3, the WL shoulder portions C3 each connecting the WL lateral surface horizontal portion SH3 and the WL end surface horizontal portion EH3, and the WL non-horizontal portions N2 each connecting the WL lateral surface horizontal portion SH3 and the multilayer body 2.

(1-10): 0.26≤length D8 in the length direction L of the WL lateral surface horizontal portion SH3/length D7 in the length direction L of the external electrode 20 is about 0.26 or more and about 0.56 or less.

(1-11): Each of the WL lateral surface horizontal portions SH3 is located farther outward from the lateral surface S of the external electrode 20 than the WL shoulder portion C3 and the WL non-horizontal portion N2.

Relationship of Length

The relationship between the lengths included in Feature 1 will be described with reference to the drawings. First, (1-2) and (1-3) will be described with reference to FIG. 4. In FIG. 4, the length of the WT main surface horizontal portion MH1 in the width direction W is indicated by D2. The length of the external electrode 20 in the width direction W is denoted by D3. The WT main surface horizontal portion MH1 of the present example embodiment satisfies about 0.26≤D2/D3≤about 0.56. Similarly, in FIG. 4, the length of the WT lateral surface horizontal portion SH1 in the lamination direction T is indicated by D4. The length of the external electrode 20 in the lamination direction T is denoted by D5. The WT lateral surface horizontal portion SH1 of the present example embodiment satisfies about 0.26≤D4/D5≤about 0.56.

Feature (1-7) will be described with reference to FIG. 6. In FIG. 6, the length of each of the LT main surface horizontal portions MH2 in the length direction L is indicated by D6. The length of the external electrode 20 in the length direction L is denoted by D7. Each of the LT main surface horizontal portions MH2 of the present example embodiment satisfies about 0.26≤D6/D7≤about 0.56.

Feature (1-10) will be described with reference to FIG. 7. In FIG. 7, the length of each of the WL lateral surface horizontal portions SH3 in the length direction L is indicated by D8. The length of the external electrode 20 in the length direction L is denoted by D7. Each of the WL lateral surface horizontal portions SH3 of the present example embodiment satisfies about 0.26≤D8/D7≤about 0.56.

Positional Relationship

The relationship between the positions included in Feature 1 will be described with reference to the drawings. First, (1-4) and (1-5) will be described with reference to FIG. 4. As shown in FIG. 4, each of the WT main surface horizontal portions MH1 is located farther outward from the main surface M than the WT shoulder portion C1. Here, "farther outward from the main surface M" indicates being located farther outward in the lamination direction T. As shown in FIG. 4, each of the WT lateral surface horizontal portions SH1 is located farther outward from the lateral surface S than the WT shoulder portion C1. Here, "located farther outward from the lateral surface S" indicates being located farther outward in the width direction W.

Next, (1-8) will be described with reference to FIG. 6. As shown in FIG. 6, the LT main surface horizontal portion MH2 is located farther outward from the main surface M than the LT shoulder portion C2 and the LT non-horizontal portion N1. Here, "located farther outward from the main surface M" indicates being located farther outward in the lamination direction.

Next, (1-11) will be described with reference to FIG. 7. As shown in FIG. 7, each of the WL lateral surface horizontal portions SH3 is located farther outward from the lateral surface S than the WL shoulder portion C3 and the WL non-horizontal portion N2. Here, "located farther outward from the lateral surface S" indicates being located farther outward in the width direction W.

Advantageous Effects of Feature 1

It is possible for the multilayer ceramic capacitor 1 of the present example embodiment with (1-1) to (1-11) to achieve the following two advantageous effects. That is, it is possible for the multilayer ceramic capacitor 1 of the present example embodiment to increase stability when mounted on a substrate. This is because each horizontal portion H has a predetermined length.

In addition, it is possible for the multilayer ceramic capacitor 1 of the present example embodiment to reduce or prevent contact of a housing with the multilayer ceramic capacitor 1 against deformation of the housing in all directions. For example, a case where a substrate is provided in a housing and the multilayer ceramic capacitor 1 is mounted on the substrate is assumed. When the housing has flexibility, the bent housing may come into contact with the multilayer ceramic capacitor 1 mounted on the substrate. The multilayer ceramic capacitor 1 of the present example embodiment includes the WT shoulder portions C1, the LT shoulder portions C2, the WL shoulder portions C3, the LT non-horizontal portions N1, and the WL non-horizontal portions N2. These portions satisfy the predetermined positional relationship with the horizontal portions H as described above. Therefore, it is possible for the multilayer ceramic capacitor 1 of the present example embodiment to reduce or prevent contact of the housing with the multilayer ceramic capacitor 1 due to deformation of the housing.

Feature 2

Next, Feature 2 will be described. The ceramic capacitor 1 of the present example embodiment includes the following features (2-1) to (2-3) as feature 2. First, as a premise of (2-1) to (2-3), the WT multilayer body shoulder portions K1, the WT shoulder portions C1, the LT multilayer body shoulder portions K2, the LT shoulder portions C2, the WL multilayer body shoulder portions K3, and the WL shoulder portions C3 are all curved lines.

(2-1): The radius of curvature of the WT multilayer body shoulder portion K1 is larger than the radius of curvature of the WT shoulder portion C1.

(2-2): The radius of curvature of the LT multilayer body shoulder portion K2 is larger than the radius of curvature of the LT shoulder portion C2.

(2-3): The radius of curvature of the WL multilayer body shoulder portion K3 is larger than the radius of curvature of the WL shoulder portion C3.

FIG. 4 shows the WT multilayer body shoulder portion K1 and the WT shoulder portions C1. FIG. 6 shows the LT multilayer body shoulder portions K2 and the LT shoulder portions C2. FIG. 7 shows the WL multilayer body shoulder portions K3 and the WL shoulder portions C3. As shown in the drawings, the radius of curvature of each of the multilayer body shoulder portions K is larger than the radius of curvature of a corresponding one of the shoulder portions C.

Advantageous Effects of Feature 2

It is possible for the multilayer ceramic capacitor 1 of the present example embodiment with (2-1) to (2-3) to achieve the following advantageous effects. In the ceramic capacitor 1 of the present example embodiment, the outer shape of the corner portions is reduced or prevented from being sharpened. This is because the radius of curvature of each of the shoulder portions C of the external electrode 20 is increased. Further, the overall volume of the ceramic capacitor 1 is reduced. This is because the outer shape of the corner portions is suppressed from being sharpened. With such a configuration, it is possible to further reduce or prevent contact of the housing with the multilayer ceramic capacitor 1 due to deformation of the housing.

Feature 3

Next, Feature 3 will be described. The ceramic capacitor 1 of the present example embodiment includes the following features (3-1) to (3-3) as feature 3.

(3-1): The radius of curvature of the WT shoulder portion C1 is about 10 μm or more and about 20 μm or less.

(3-2): The radius of curvature of the LT shoulder portion C2 is about 10 μm or more and about 20 μm or less.

(3-3): The radius of curvature of the WL shoulder portion C3 is about 10 μm or more and about 20 μm or less.

Advantageous Effects by Feature 3

It is possible for the multilayer ceramic capacitor 1 of the present example embodiment with (3-1) to (3-3) to achieve the following advantageous effects. In the ceramic capacitor 1 of the present example embodiment, when the radius of curvature of each of the shoulder portions C is set to a value within a predetermined range, the external electrode 20 can be prevented from being too thin at each of the shoulder portions C, and the outer shape of the corner portions of the external electrode 20 is suppressed from being sharpened. With such a configuration, it is possible to further reduce or prevent contact of a housing with the multilayer ceramic capacitor 1 due to deformation of the housing while ensuring electrical conductivity of the external electrode 20.

Feature 4

Next, Feature 4 will be described. The ceramic capacitor 1 of the present example embodiment includes the following features (4-1) to (4-3) as feature 4.

(4-1): The radius of curvature of the WT multilayer body shoulder portions K1 is about 8 μm or more and about 16 μm or less.

(4-2): The radius of curvature of the LT multilayer body shoulder portion K2 is about 8 μm or more and about 16 μm or less.

(4-3): The radius of curvature of the WL multilayer body shoulder portion K3 is about 8 μm or more and about 16 μm or less.

Advantageous Effects by Feature 4

It is possible for the multilayer ceramic capacitor 1 of the present example embodiment with (4-1) to (4-3) to achieve the following advantageous effects. In the ceramic capacitor 1 of the present example embodiment, by setting the radius of curvature of the multilayer body shoulder portion K to a value within a predetermined range, it is possible to easily set the radius of curvature of the shoulder portion C located outside the multilayer body shoulder portion K to a desired range. With such a configuration, it is possible to further reduce or prevent contact of a housing with the multilayer ceramic capacitor 1 due to deformation of the housing.

Method of Manufacturing Multilayer Ceramic Capacitor

An example of a manufacturing method will be described. The multilayer ceramic capacitor 1 of the present example embodiment can be manufactured by the same or substantially the same method as the conventional multilayer ceramic capacitor 1 as a general flow of the manufacturing process. In order to form the desired horizontal portions H, shoulder portions C, and non-horizontal portions N, for example, a method of polishing the external electrode 20 after forming the external electrode 20 can be exemplified.

In addition, in order to form desired multilayer body shoulder portions K, a method of polishing the multilayer body 2 after forming the multilayer body 2 can be exemplified.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:

a multilayer body including a plurality of dielectric layers and a plurality of internal electrode layers that are laminated, a first main surface and a second main surface opposed to each other in a lamination direction, a first lateral surface and a second lateral surface opposed to each other in a width direction orthogonal or substantially orthogonal to the lamination direction, and a first end surface and a second end surface opposed to each other in a length direction orthogonal or substantially orthogonal to the lamination direction and the width direction; and external electrodes respectively provided on the first end surface and the second end surface and connected to the plurality of internal electrode layers; wherein each of the external electrodes extends to at least a portion of each of the first main surface, the second main surface, the first lateral surface, and the second lateral surface;

a cross section in parallel or substantially in parallel to the width direction and the lamination direction is defined as a WT cross section, a cross section in parallel or substantially in parallel to the length direction and the lamination direction is defined as an LT cross section, and a cross section in parallel or substantially in parallel to the width direction and the length direction is defined as a WL cross section;

when viewed in the WT cross section, each of the external electrodes includes a WT main surface horizontal portion, a WT lateral surface horizontal portion, and a WT shoulder portion connecting the WT main surface horizontal portion and the WT lateral surface horizontal portion;

a relationship of a length in the width direction of the WT main surface horizontal portion to a length in the width direction of each of the external electrodes is in a range of about 0.26 or more and about 0.56 or less;

a relationship of a length in the lamination direction of the WT lateral surface horizontal portion to a length in the lamination direction of each of the external electrodes is in a range of about 0.26 or more and about 0.56 or less;

the WT main surface horizontal portion is located farther outward from the main surface than the WT shoulder portion;

the WT lateral surface horizontal portion is located farther outward from the lateral surface than the WT shoulder portion;

when viewed in the LT cross section, each of the external electrodes includes an LT main surface horizontal portion, an LT lateral surface horizontal portion, an LT shoulder portion connecting the LT main surface horizontal portion and the LT lateral surface horizontal portion, and an LT non-horizontal portion connecting the LT main surface horizontal portion and the multilayer body;

a relationship of a length in the length direction of the LT main surface horizontal portion to a length in the length direction of each of the external electrodes is in a range of about 0.26 or more and about 0.56 or less;

the LT main surface horizontal portion is located farther outward from the main surface than the LT shoulder portion and the LT non-horizontal portion;

when viewed in the WL cross section, each of the external electrodes includes a WL lateral surface horizontal portion, a WL end surface horizontal portion, a WL shoulder portion connecting the WL lateral surface horizontal portion and the WL end surface horizontal portion, and a WL non-horizontal portion connecting the WL lateral surface horizontal portion and the multilayer body;

a relationship of a length of the WL lateral surface horizontal portion to a length in the length direction of each of the external electrodes is in a range of about 0.26 or more and about 0.56 or less; and the WL lateral surface horizontal portion is located farther outward from the lateral surface than the WL shoulder portion and the WL non-horizontal portion.

2. The multilayer ceramic capacitor according to claim 1, wherein when viewed in the WT cross section, a portion of the multilayer body where the main surface and the lateral surface intersect is defined as a WT multilayer body shoulder portion;

when viewed in the LT cross section, a portion of the multilayer body where the main surface and the end surface intersect is defined as an LT multilayer body shoulder portion;

when viewed in the WL cross section, a portion of the multilayer body where the lateral surface and the end surface intersect is defined as a WL multilayer body shoulder portion;

a radius of curvature of the WT multilayer body shoulder portion is larger than a radius of curvature of the WT shoulder portion;

a radius of curvature of the LT multilayer body shoulder portion is larger than a radius of curvature of the LT shoulder portion; and a radius of curvature of the WL multilayer body shoulder portion is larger than a radius of curvature of the WL shoulder portion.

3. The multilayer ceramic capacitor according to claim 2, wherein the radius of curvature of the WT multilayer body shoulder portion is larger than the radius of curvature of the WT shoulder portion in a range of about 1.25% or more and about 2% or less;

the radius of curvature of the LT multilayer body shoulder portion is larger than the radius of curvature of the LT shoulder portion in a range of about 1.25% or more and about 2% or less; and the radius of curvature of the WL multilayer body shoulder portion is larger than the radius of curvature of the WL shoulder portion in a range of about 1.25% or more and about 2% or less.

4. The multilayer ceramic capacitor according to claim 2, wherein the radius of curvature of the WT shoulder portion is in a range of about 10 μm or more and about 20 μm or less;

the radius of curvature of the LT shoulder portion is in a range of about 10 μm or more and about 20 μm or less; and the radius of curvature of the WL shoulder portion is in a range of about 10 μm or more and about 20 μm or less.

5. The multilayer ceramic capacitor according to claim 2, wherein the radius of curvature of the WT multilayer body shoulder portion is in a range of about 8 μm or more and about 16 μm or less;

the radius of curvature of the LT multilayer body shoulder portion is in a range of about 8 μm or more and about 16 μm or less; and the radius of curvature of the WL multilayer body shoulder portion is in a range of about 8 μm or more and about 16 μm or less.

6. The multilayer ceramic capacitor according to claim 1, wherein each of the external electrodes includes a base electrode layer, an inner plated layer covering the base electrode layer, and a surface plated layer covering the inner plated layer;

the inner plated layer includes a Ni plated layer; and the surface plated layer includes a Sn plated layer.

7. The multilayer ceramic capacitor according to claim 6, wherein the base electrode layer includes metal and glass.

8. The multilayer ceramic capacitor according to claim 7, wherein the metal includes at least one of Ni, Ag, Pd, or Au or an alloy such as an Ag—Pd alloy as a main component.

9. The multilayer ceramic capacitor according to claim 1, wherein the multilayer body has a rectangular or substantially rectangular parallelepiped shape.

10. The multilayer ceramic capacitor according to claim 1, wherein a dimension of the multilayer body in the length direction is about 0.05 mm or more and about 1.00 mm or less;

a dimension of the multilayer body in the lamination direction is about 0.10 mm or more and about 0.50 mm or less; and a dimension of the multilayer body in the width direction is about 0.10 mm or more and about 0.50 mm or less.

11. The multilayer ceramic capacitor according to claim 1, wherein a number of the plurality of dielectric layers is 10 or more and 2000 or less.

12. The multilayer ceramic capacitor according to claim 1, wherein each of the plurality of dielectric layers includes $BaTiO_3$, $CaTiO_3$, $SrTiO_3$, $CaZrO_3$, or $TiO_2$ as a main component.

13. The multilayer ceramic capacitor according to claim 12, wherein each of the plurality of dielectric layers includes a Mn compound, a Fe compound, a Cr compound, a Co compound, or a Ni compound as a subcomponent.

14. The multilayer ceramic capacitor according to claim 1, wherein a number of the plurality of internal electrode layers is 10 or more and 1000 or less.

15. The multilayer ceramic capacitor according to claim 1, wherein a thickness of each of the plurality of internal electrode layers is about 0.3 μm or more and about 0.4 μm or less.

16. The multilayer ceramic capacitor according to claim 1, wherein each of the plurality of internal electrode layers includes Ni, Cu, Ag, Pd, or Au, an alloy of Ni and Cu, or an alloy of Ag and Pd.

* * * * *